Figure 1:
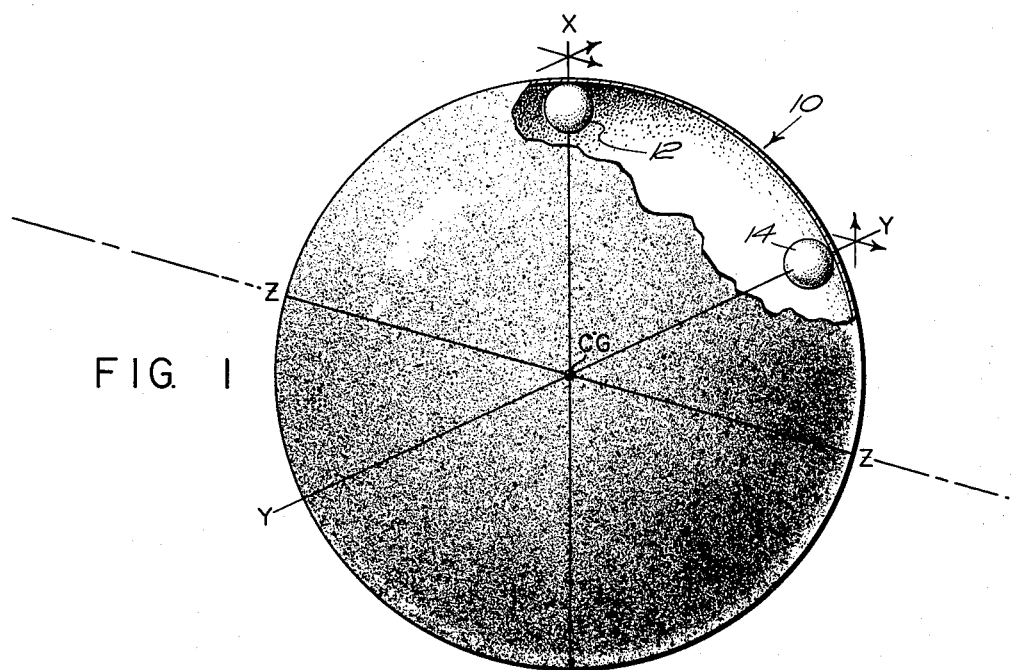

INVENTOR.
VALDEMAR A. SKOV
BY
Morse + Altman
ATTORNEYS

United States Patent Office 3,258,223
Patented June 28, 1966

3,258,223
ATTITUDE SENSING AND CONTROL SYSTEM FOR ARTIFICIAL SATELLITES
Valdemar A. Skov, Wayland, Mass., assignor, by mesne assignments, to Wayne-George Corporation, Newton, Mass., a corporation of Massachusetts
Filed Oct. 31, 1961, Ser. No. 148,875
3 Claims. (Cl. 244—1)

This invention relates in general to a system for sensing and controlling the attitude of artificial satellites and more particularly concerns an attitude stabilization system in which electrically suspended masses are employed to detect differential gravitational forces at different points within the satellite and to produce a signal for actuating an attitude correction system.

For certain missions it is critical that an artificial satellite assume and maintain a certain predetermined attitude relative to the orbited body. Planetary orbiting reconnaissance, surveillance and communication satellites for example must present a constant face to the orbited body over a long period of time. Absolute orientation of the satellite is particularly critical where a relatively narrow zone on the orbited body is being monitored by the satellite.

At the present time, several different measures have been proposed to bring an arbitrarily tumbling satellite into a predetermined attitude relative to the orbited body. A stable platform presents one possible solution to the problem. However, the platform would require a computer to determine the position of the satellite and to compute the correct heading of the satellite based upon its instantaneous position. Not only must the gyros and accelerometers used by the platform be made sufficiently rugged to operate satisfactorily during sustained accelerations in launching, but, because of minute and inherent imperfections in the gyros and accelerometers, a certain amount of uncompensatable drift will occur over a period of time which will eventually build up an unknown but cumulative error.

An alternative measure is to utilize rate gyros to reduce to zero rotation about two orthogonal axes while permitting rotation about the third axis to be equal to the orbital angular velocity. However, this system would also accumulate drift error in the same fashion as any other gyro stabilized system.

More recently infra-red or optical horizon scanners have been proposed to stabilize satellites. These devices are able to determine and control only the vertical attitude of the satellite and, because of variations in the apparent center of radiation of the orbited body or because of changing atmospheric conditions, the accuracy of scanners are limited at best to two or three degrees.

Accordingly, it is an object of the present invention to provide an improved system for sensing and controlling the attitude of an artificial satellite relative to the orbited body.

Another object of this invention is to provide an attitude sensing and control system for artificial satellites that is at once simple, accurate and reliable.

Still another object of this invention is to provide an attitude sensing and control system for artificial satellites which is capable of accurately orienting a satellite about three orthogonal axes and to maintain the satellite in a predetermined attitude over an extended period of time without deviation.

Yet another object of this invention is to provide an attitude sensing and control device for an artificial satellite that can be readily programmed to operate during selected predetermined periods.

More particularly, this invention features a satellite attitude sensing and positioning system in which differential gravitational forces are measured and their directions determined at different points within the satellite. The system includes electrically suspended masses located along at least two mutually perpendicular axes of the satellite to measure the direction and magnitude of the internal forces within the satellite and to thereby actuate attitude control devices through a closed loop servo control system.

Figure 2:
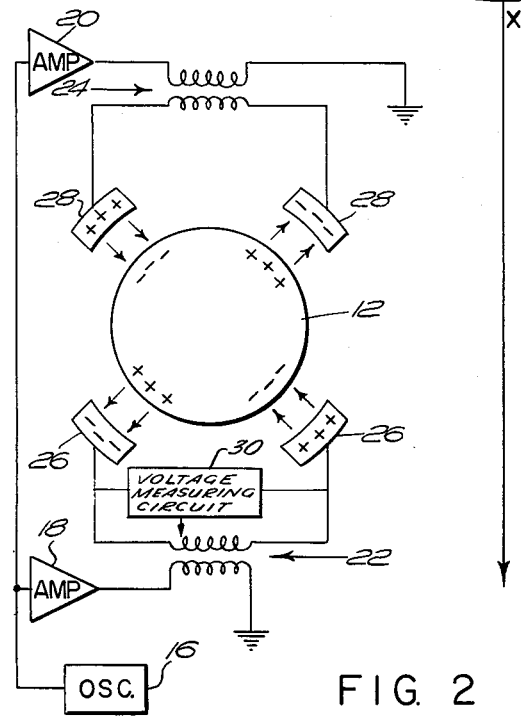

But these and other features of the invention, along with further objects and advantages thereof, will become more fully apparent from the following detailed description taken in connection with the accompanying drawings in which:

FIG. 1 is a view in perspective of a spherical artificial satellite with parts broken away to show the mounting of attitude sensors made according to the invention, and, FIG. 2 is a diagram of a simplified circuit which may be employed in the attitude sensing system.

Referring now to the drawings, reference character 10 generally indicates a spherical artificial satellite orbiting along a path Z about a planet or other body having a substantial mass and whose center of gravity is located directly below the satellite along a vertical axis X. A third axis Y, mutually perpendicular to the Y and Z axes, completes the orthogonal coordinates of the satellite. It is assumed for purposes of description that the center of gravity of the illustrated satellite is located at its geometric center.

In a preferred embodiment of this invention, electrically conducting spherical masses 12 and 14 are located along both the X and Y axes as far from the satellite's center of gravity as practicable. Each spherical mass is suspended without mechanical support in an alternating electric field. As shown in FIG. 2, this field is generated by means of an oscillator 16 connected by a lead to a pair of amplifiers 18 and 20. Each amplifier is connected to the primary of a transformer 22 and 24 with the secondaries being connected to pairs of electrodes 26 and 28 located on opposite sides of and spaced from the spherical mass 12.

In FIG. 2 only the circuit elements necessary for suspension of the mass 12 along one of its axes are shown and it will be understood that for each of the masses 12 and 14 in a complete suspension system three sets of elements are used to stabilize each mass with one set located around each of three orthogonal axes and each set including two pairs of electrodes.

Each spherical mass is stabilized within its electrode structure by an alternating voltage applied across adjacent electrodes, which in turn induces a charge distribution on the sphere and creates an electric force field between the electrodes and the sphere. The electrodes and the sphere form a condenser whose capacity is inversely proportional to the distance between the sphere and the electrodes. Each pair of electrodes is associated with an inductance, the secondaries of transformers 22 and 24, to form a tuned circuit whose resonant frequency depends on the position of the sphere relative to the electrode structure. The tank circuits are excited from a common power source resonant at a frequency above their normal resonant frequency. As the sphere moves relative to the electrode structure for reasons that will be set forth below, the impedance of the electrode pairs changes, the induced voltages between the electrodes and sphere 12 vary and the electric force field changes accordingly. If the parameters of the tank circuit are properly chosen, the force position relationship will be such that the sphere is in stable equilibrium at the center of the electrode structure. Any displacement of the sphere caused by applied forces or accelerations will be counteracted by an electric force which tends to reduce this displacement. The force of the electric field tending to reduce the displacement is measured by the voltage difference between electrode pair 26, e.g., and sphere 12. Hence, the voltage across electrode pair 26 provides an indication of the position of satellite 10 relative to the desired orbital path Z for the reasons set forth infra. The voltage across electrode pair 26 is measured with voltage measuring circuit 30 that derives a signal to actuate controllers, of the type known to those skilled in the art, for positioning satellite 10 relative to orbital path Z.

The attitude sensing devices which are the subject matter of this invention operate on the following principles. In an orbiting artificial satellite each element which makes up the satellite is attracted toward the center of mass of the orbited body by a gravitational force, the magnitude of which is proportional to the mass of the element and inversely proportional to the square of the distance between the element and the center of gravity of the orbited body. Therefore, the magnitude and direction of the gravitational force vector acting on a mass element are a function of the position of the element within the satellite and the orientation of the satellite with respect to its orbit.

Each mass element tends to accelerate under the influence of its associated gravitational force, but, since the elements are rigidly connected together, they are not free to move independently. Consequently, the satellite moves as if all its mass were concentrated at its center of gravity and all the forces were summed and acted at the centroid. The satellite assumes an orbit such that the resultant gravitational pull remains just sufficient to provide the radial acceleration of the center of gravity to maintain the satellite in orbit. The individual mass elements are constrained to accelerate according to their positions within the satellite. In each case, the acceleration vector associated with each mass element is directed toward the normal to the orbital plane at the center of the orbit. In other words, each vector is parallel to the orbital plane.

The magnitude of the acceleration vector varies directly with the distance from the mass element to the center of the earth. In general, the gravitational force vector and the acceleration force vector do not coincide but are equal only for those elements located on the orbital line Z. Outside the orbital line Z, the gravitational force is insufficient to produce the necessary acceleration while inside the line it is excessive. Mass elements displaced from the orbital plane experience a component of the gravitational force directed toward the plane. In general, under the influence of gravity alone, elements of mass displaced along the Y axis from the satellite's center of gravity tend to move toward the orbital plane. Elements displaced along the X axis tend to move farther from the centroid along a line through the center of mass of the earth. But in a rigid, spherically-symmetrical satellite, relative motion of the elements is prevented by internal restraining forces and equilibrium exists as the internal forces and torques cancel the gravitational unbalance.

The unbalanced forces and torques described above are extremely small by normal standards. For example, in a satellite orbiting the earth at an altitude of 200 km., a mass of 1 kgm. located 1 meter from the satellite's center of gravity along the X axis is pulled away from the satellite with a force of approximately 40 dynes. The unbalanced force is approximately linear with the distance from the center of gravity in the neighborhood of the satellite. Under the same conditions a mass of 1 kgm. located along the Y axis one meter from the centroid is pulled toward the orbital plane by a component of the gravitational force of a magnitude of 14 dynes. This force increases linearly with the distance from the orbital plane.

By locating the sensing devices described above and illustrated in FIGS. 1 and 2, about the X and Y axes of the satellite, and as far away from the centroid of sphere 10 as possible, the direction and magnitude of the external forces acting on the spherical masses 12 and 14 may be measured. The information thus obtained may be used to actuate suitable control devices such as gas jets, rotating masses and the like, which will stabilize the satellite in its proper attitude.

As in any gravity difference detection system, there exists a 180° ambiguity about each axis; that is, the sensors cannot distinguish between up and down or fore and aft since the force field is essentially symmetrical about the center of gravity of the satellite. This 180° ambiguity can be resolved by the use of a relatively simple auxiliary sensor such as an infra-red scanner or the like, to initially orient the satellite to within 90° of the desired attitude.

In practice, it is necessary to provide only two sensors for the satellite since these will provide all of the information needed with regard to the attitude of the satellite about its three axes. By way of explanation, in FIG. 1 the sensor located along the X axis is able to detect and measure forces which are parallel to both the Y and Z axes, while the sensor located on the Y axis is able to detect and measure forces parallel to X and Z axes.

Assuming a suspension system in which six pairs of electrodes are employed to suspend the masses in the above example, the total power dissipated would be quite small being in the order of 41 milliwatts.

To demonstrate in more detail how the suspension system functions and the manner in which circuit 30 derives a voltage indicative of the force exerted by the electrostatic field between electrode pair 26 and sphere 12, consider that the secondary of transformer 22, having an inductance L, together with its inherent resistance, $R_s$, in combination with the capacity between electrode pair 26 and sphere 12 forms a simple series tuned network. The network is driven at a frequency above its normal resonant frequency by waves coupled to the transformer secondaries from oscillation source 16. Electrode pair 26 and sphere 12 can be considered, to a close approximation, as a simple parallel plate capacitor. The capacitor comprises two series capacities, one of which is the capacity between one of the electrodes in the electrode pair and sphere 12 while the other is between sphere 12 and the other electrode of the pair. Each of the series capacitors has a value of 2C to provide a total series capacitance C. The area of the variable capacity thus formed can be considered as the area, A, of the surface of one electrode of electrode pair 26 that faces sphere 12. The distance between the electrodes of the capacitor can be considered as $d$ if the distance between one of the electrodes of electrode pair 26 and sphere 12 is taken as $d/2$. In consequence, the electrode pair 26 has a total capacity $$C = \frac{\epsilon_o A}{d} \quad (1)$$

where $\epsilon_o$ is the dielectric constant of free space, in farads per meter.

If it is assumed that a voltage of $V_c \cos wt$ is applied across electrodes 26, a force $$F = \frac{4|V_c|^2 \epsilon_o A}{d^2} \quad (2)$$

attracts the sphere 12 to electrodes 26. The voltage applied to the series tuned circuit by oscillator 16 is $V \cos wt$ so that the force applied to sphere 12 by electrode pair 26 is $$F = \frac{4\epsilon_o A |V|^2}{d^2 - 2\epsilon_o A w^2 L d + \epsilon_o^2 A^2 w^2} \quad (3)$$

Equation 3, when plotted as a function of force exerted on the sphere versus distance between sphere 12 and electrode pair 26 resembles the plot of a single tuned series network. Hence, maximum attractive force value exists at a certain distance, $d_o = \epsilon_o A w^2 L$, between sphere 12 and electrode pair 26. The attractive force increases with spacing between electrodes 26 and sphere 12 up to the distance $d_0$ which is determined by the area of one electrode of electrode pair 26, the frequency of source 16 and the inductance value.

Since the voltage of source 16, V, the circuit inductance, L, and resistance, $R_s$, remain constant, the voltage between electrodes 26 is a function of the distance between the electrodes and sphere 12, hence the value of variable capacity C and the force exerted by electrodes 26 on sphere 12. This is seen from the following analysis $$V_c = \frac{V}{\sqrt{R_s^2 w^2 C^2 + (w^2 LC - 1)^2}} \quad (4)$$

Substituting Equation 1 into Equation 4 gives:

$$V_c = \frac{Vd}{\sqrt{(R_s^2 + w^2 L^2)\epsilon_o^2 A^2 w^2 + d(1 - Zw^2 L \epsilon_o A)}} \quad (5)$$

Inspection of Equation 5 reveals that as the distance between sphere 12 and electrodes 26 increases the voltage between the electrodes also increases. Since Equation 2 indicates that the attractive force between sphere 12 and electrodes 26 is a function of distance it follows that $V_c$ is also a function of the distance of satellite 10 from orbital path Z.

It will be appreciated that the system disclosed herein enjoys many advantages over other types of stabilization systems. The system need not be made operative until the satellite has reached its orbit, and therefore need not be designed to work under sustained large accelerations as is the case with gyros. Furthermore, the system is not subject to drift and accumulative errors with the result that the satellite remains absolutely oriented relative to the orbited body.

Having thus described my invention, what I claim and desire to obtain by Letters Patent of the United States is:

1. In an artificial satellite having means for deriving a signal for controlling the attitude of the satellite with respect to an orbited body, a system for sensing the attitude of the satellite, comprising a plurality of electrically conducting spherical masses each displaced from the center of gravity of the satellite and along mutually perpendicular axes, a plurality of electrodes spaced about each of said masses, means connecting said electrodes for generating an oscillating electrical force field suspending each of said masses in a normally rest position, said masses forming a condenser with said electrode whereby displacement of any one of said masses relative to its associated electrodes will alter the capacitance of said condenser and means responsive to variations in said capacitance for deriving said signal.

2. An artificial satellite according to claim 1 wherein at least one of said masses is located normally along an axis perpendicular to the orbital plane of said satellite and another of said masses is located normally in the orbital plane and along an axis passing through the centers of gravity of both said satellite and the orbited body.

3. In an artificial satellite having means for deriving a signal for controlling the attitude of the satellite with respect to an orbited body, a system for sensing the attitude of the satellite, comprising a plurality of masses each displaced from the center of gravity of the satellite, a plurality of electrode pairs, the electrodes of each pair being spaced adjacent to each other about the orthogonal axes of each of said masses, oscillating circuit means connecting said electrodes and adapted to generate an electrical field for suspending each of said masses in a normally rest position evenly spaced from said electrodes, said masses together with said electrodes providing capacitance for said oscillating circuit whereby displacement of any one of said masses relative to its associated electrodes will alter the capacitance of said circuit and means responsive to variations in said capacitance for deriving said signal.

References Cited by the Examiner

UNITED STATES PATENTS 3,003,356  10/1961  Nordsieck _____ 73—517
3,048,108  8/1962  Roberson et al. _____ 244—1

FERGUS S. MIDDLETON, *Primary Examiner.*